United States Patent [19]

Smith, Jr. et al.

[11] Patent Number: 5,512,148

[45] Date of Patent: *Apr. 30, 1996

[54] INDUCING TILTED PARALLEL ALIGNMENT IN LIQUID CRYSTALS

[75] Inventors: Willis H. Smith, Jr., Newbury Park; Leroy J. Miller, West Hills, both of Calif.

[73] Assignee: Hughes Aircraft Company, Los Angeles, Calif.

[*] Notice: The term of this patent shall not extend beyond the expiration date of Pat. No. 5,350,498.

[21] Appl. No.: 284,720

[22] Filed: Aug. 2, 1994

Related U.S. Application Data

[63] Continuation of Ser. No. 64,565, May 19, 1993, abandoned.

[51] Int. Cl.$^6$ .................................................. C23C 14/34
[52] U.S. Cl. ........................... 204/192.23; 204/192.15; 204/192.26; 427/108; 427/167; 427/344
[58] Field of Search ...................... 204/192.15, 192.26, 204/192.29, 192.23; 428/108, 167, 344

[56] References Cited

U.S. PATENT DOCUMENTS

| | | | |
|---|---|---|---|
| 4,022,934 | 5/1977 | Miller | 427/126 |
| 4,030,997 | 6/1977 | Miller et al. | 204/192 |
| 4,153,529 | 5/1979 | Little et al. | 204/192 |
| 4,392,931 | 7/1983 | Maniv et al. | 204/298.28 X |
| 4,728,406 | 3/1988 | Banerjee et al. | 204/192.26 X |
| 4,851,095 | 7/1989 | Scobey et al. | 204/192.26 X |
| 5,011,267 | 4/1991 | Miller et al. | 350/340 |

OTHER PUBLICATIONS

W. P. Bleha, "Progress in Liquid Crystal Light Valves", Laser Focus/Electro–Optics, pp. 111–120 (Oct. 1983).

J. L. Janning, "Thin film surface orientation for liquid crystals", Applied Physics Letters, vol. 21, pp. 173–174 (1972).

*Primary Examiner*—Nam Nguyen
*Attorney, Agent, or Firm*—V. D. Duraiswamy; W. K. Denson-Low

[57] ABSTRACT

A substrate is treated prior to use to induce a near-parallel orientation of a liquid crystal director relative to the substrate. A layer of silica is deposited on the substrate by in-line magnetron sputtering as the substrate is moved past the sputtering target, and the silica-coated substrate is thereafter treated with an alcohol that is selected from one of two classes of alcohols: (1) alcohols having an aromatic ring structure on one end of an aliphatic chain and a hydroxy group on the other end, with or without at least one ether group in the chain, and (2) an aliphatic chain having a hydroxy group at one end and at least one ether linkage in the chain. An example is 2-phenylethanol. The alcohol-treated substrate is covered with a layer of the liquid crystal. The process of the invention induces a tilt to the director of the liquid crystal. The tilt is about 0.5° to 4°, as measured parallel to the surface of the substrate.

19 Claims, 2 Drawing Sheets

INDUCING TILTED PARALLEL ALIGNMENT IN LIQUID CRYSTALS

This a continuation of application Ser. No. 08/064,565, filed May 19, 1993, abandoned.

BACKGROUND OF THE INVENTION

1. Field of the Invention

The present invention relates generally to liquid crystals, and, more particularly, to a substrate that prealigns a liquid crystal layer.

2. Description of Related Art

One type of liquid crystal electro-optical device is constructed by placing a thin layer of liquid crystal between two transparent plates that have each been coated with a layer of an electrical conductor on its interior face. When no electric field is applied (field-OFF) between the conductive layers, the director of the liquid crystal is in one state. (The "director" of the liquid crystal is the average macroscopic direction of the long molecular axis of the liquid crystal molecules.) When an electric field is applied (field-ON), the director reorients to another state. Because the liquid crystal is birefringent, the two states will have different refractive indices, and in many cases the thin layer of liquid crystal will be birefringent for light directed against the transparent plates. The state change responsive to an applied electric field is the basis for liquid crystal devices that control light, such as displays and liquid crystal light valves used in projectors.

In its usual form, a liquid crystal light valve is a device that modulates a polarized projection light beam directed against one side of the light valve according to a writing light beam directed against the other side. The polarized projection light beam enters the light valve through one of the transparent electrodes, usually termed the counterelectrode, passes through the liquid crystal layer, and is reflected from a mirror on the other electrode. The projection light beam passes back through the liquid crystal layer and the counterelectrode, and through an external analyzer. The polarizing and analyzing functions can often be accomplished by a single polarizing beam splitter through which the projection light beam passes before and after passing through the liquid crystal. The operation of this and other types of liquid crystal light valves is discussed in greater detail in numerous technical publications; see, for example, "Progress in Liquid Crystal Light Valves", by W. P. Bleha, in *Laser Focus/Electro Optics*, October 1983, pages 111–120.

In this type of liquid crystal light valve, an electric bias field is applied through the liquid crystal layer by a voltage on the conductive electrodes. The liquid crystal is oriented responsive to this electric bias field. The director of the liquid crystal is initially, in the electric field OFF state, aligned perpendicular to the plates. Application of the electric field causes the director to rotate toward the plane of the plate, changing the light transmittance of the device. The writing light pattern modulates the electric field, changing the phase retardation of the light passing through the liquid crystal, which in turn modulates the projection light beam passing through the analyzer.

For certain applications it is desirable to orient the directors of these liquid crystals such that they assume parallel alignment with respect to the surface of a substrate. Such an alignment is necessary for certain television projection displays and color symbology light valves. In general, parallel alignment is desirable if an electric field is applied across the liquid crystal normal to the surfaces, and if the liquid crystal has a positive dielectric anisotropy, so that when the molecules lie parallel to the substrate surface they can be tilted towards a perpendicular orientation.

U.S. Pat. No. 4,030,997, issued Jun. 21, 1977, to L. J. Miller et al, U.S. Pat. No. 4,022,934, issued May 10, 1977 to L. J. Miller, and U.S. Pat. No. 5,011,267, issued Apr. 30, 1991, to L. J. Miller et al describe methods for aligning liquid crystal molecules in the homeotropic (or perpendicular) or the tilted perpendicular orientation. While these patents are certainly suitable for the purposes intended, the homeotropic liquid crystal alignment processes described are useful with liquid crystals having a negative dielectric anisotropy.

There are also methods for aligning the liquid crystal molecules parallel to the surface ("homogeneous" alignment). Such parallel liquid crystal alignment processes are useful with liquid crystals having a positive dielectric anisotropy.

The simplest alignment method is to rub the surface, but this produces a streaky surface alignment which is not very uniform on a microscopic scale. Another method is to coat the surface with $SiO_2$ and etch the surface with an ion beam, as described in U.S. Pat. No. 4,153,529 by M. J. Little et al. This produces a parallel alignment with "splay," in which the alignment direction varies systematically across the substrate, due to divergence of the ion beam. Yet another method is oblique deposition as reported by J. L. Janning, Applied *Physics Letters*, Vol. 21, pp.173–174 (1972), but this also produces "splay" in the alignment because of divergence in the deposition beam.

The use of beams, such as ion beams or evaporated beams of $SiO_x$ molecules or particles, are inherently divergent, and the alignment of the liquid crystal on the surface replicates the divergence of the beam. For example, the molecules at one point on a surface may be aligned in a direction that differs by 3° to 7° from the direction of alignment an inch away on the same surface. This non-uniformity can be seen when the device is viewed between crossed polarizers.

There remains a need for a process which aligns nematic liquid crystals in a substantially parallel, homogeneous alignment. The present invention fulfills this need, and further provides related advantages.

SUMMARY OF THE INVENTION

In accordance with the present invention, a two-step treatment technique for preparing a substrate induces a tilt to the director of a liquid crystal applied to the substrate The tilt is from about 0.5° to 4°, as measured parallel to the surface of the substrate, and is of uniform azimuth such that the projections of the directors onto the substrate all lie approximately parallel. The treatment is stable to temperature variation. The two-step process combines ion beam sputtering of silica onto the substrate, followed by treating the surface of the silica-coated substrate with an appropriate alcohol. The appropriate alcohol for use in the practice of the invention is selected from one of two classes of alcohols: (1) alcohols having an aromatic ring structure on one end of an aliphatic chain and a hydroxy group on the other end, with or without at least one ether group in the chain, and (2) an aliphatic chain having a hydroxy group at one end and at least one ether linkage in the chain.

The process of the present invention results in alignment of nematic liquid crystals in a near-parallel, homogeneous orientation. This alignment permits critical optical adjustments of the cell in the "OFF" state and reduces the occurrence of "splay" or random orientation of molecules. The present alignment method is much more uniform than any of the prior art and makes it possible to produce a higher quality display.

In the process of the invention, the layer of silica is deposited on the substrate from a source of silica with the substrate moving past the source during deposition.

It has been found that a directional orientation is produced in a deposited silica layer by moving the substrate past a magnetron in-line sputtering source during deposition. The substrate is typically a transparent glass on which a thin transparent layer of an electrical conductor such as indium-tin-oxide (ITO) has been previously deposited. One or more passes are typically required during silica deposition, and the resulting structure has the necessary directionality as long as the substrate moves back and forth along the same direction past the sputtering source. After the deposition of the silica layer, the silica-treated substrate is contacted with the alcohol at a sufficiently high temperature to react the alcohol with the hydroxyl groups on the surface of the silica layer. The alcohol treatment typically is made with the substrate above 100° C. and most typically 120° to 160° C. After the alcohol treatment, the liquid crystal is contacted to the treated surface.

One form of device using the approach of the invention is constructed by using two similarly treated substrate electrodes, one inverted over the other, with the liquid crystal material between the two substrates. Care is taken to orient the second of the substrates so that the director of the liquid crystal is oriented in a compatible manner. In the most common situation, a compatible orientation means that the tilt direction of the liquid crystal at the surfaces of, and between, the two opposing substrates is the same. In other situations, a compatible orientation may mean that there is a controllable twist in the liquid crystal director through the thickness of the liquid crystal layer. An electric field applied between the two conductive layers of the facing substrates is used to reorient the liquid crystal director to other states.

The present invention achieves a uniformly tilted liquid crystal with a relatively inexpensive procedure that produces good uniformity of tilt and good stability. Other features and advantages of the invention will be apparent from the following more detailed description of the preferred embodiment, taken in conjunction with the accompanying drawings, which illustrate, by way of example, the principles of the invention.

DESCRIPTION OF THE PREFERRED EMBODIMENTS

Figure 1:
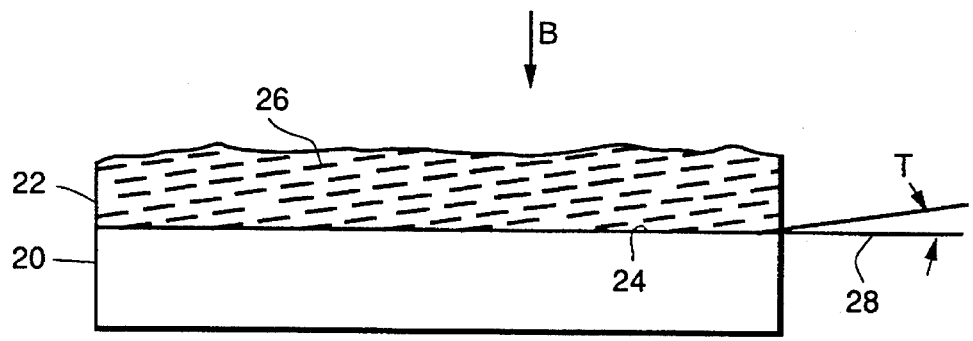
FIG. 1 is a schematic side elevational view of a substrate that has been treated, with the electric field in the field-OFF state.

By sputtering $SiO_2$ onto a substrate while it is translated beneath the sputtered beam, then treating the $SiO_2$ surface with a long chain aliphatic alcohol (e.g., 1-octadecanol) either in the vapor or the liquid phase, and then rinsing the surface with a solvent for the alcohol to remove any excess, a surface is produced that is able to induce an excellent tilted-perpendicular alignment of liquid crystals. This alignment, which is described in application Ser. No. 07/715,537, filed Jun. 14, 1991, abandoned in the names of W. H. Smith et al and assigned to the same assignee as the present application, is more uniform than any other alignment seen to date with the same orientation of the director, and had other superior properties.

However, further work has surprisingly shown that certain classes of alcohols result in tilted-parallel alignment of liquid crystals. For example, in a cell made with the commercial liquid crystal E7 and employing the aromatic alcohol 2-phenylethanol, the alignment had a tilt angle of 1.6° away from the surface-parallel position. This tilt angle was measured by an accepted method in which the capacitance of the cell is monitored as the cell is rotated in a strong magnetic field.

This small tilt angle is very important, because when an electric field is applied across the liquid crystal layer, the liquid crystal director will rotate in only one direction toward the perpendicular orientation. If this rotation in only one direction were not to happen, there would be a visible line, called a disclination, between two regions of opposite rotation. Such disclination lines ruin the optical quality of the device and must be avoided. At present, the only way that these disclinations can be avoided is to have a small tilt angle, for example, 1.6°, in the alignment of the liquid crystal in the OFF state.

Prior to the development of the present invention, the question had been raised as to whether it would be possible to obtain a parallel alignment on the $SiO_2$ surface deposited by moving deposition. At that time, aligning the liquid crystals on the untreated surface was tried. This was based on the reasoning that if the alcohol-treated surface produces a tilted perpendicular alignment, then the un-treated surface should give a parallel alignment (by analogy to the results with an ion-beam-etched surface). However, in repeated experiments, a good, uniform parallel alignment on the untreated surface could not be obtained. The liquid crystal molecules aligned parallel to the surface, but the liquid crystal director (or optic axis) varied from place to place across the surface. The alignment direction appeared to depend on how the liquid crystal molecules first contacted the surface, rather than on the surface topography induced by the moving deposition. This result was similar to that which was previously obtained on an unetched, untreated $SiO_2$ surface that had been deposited by sputtering without translating the substrate under the $SiO_2$ beam.

Therefore, the value of the substantially parallel alignment induced by treating the $SiO_2$ with 2-phenylethanol was recognized, since it was the first time that a good, uniform parallel alignment on the surface deposited by moving deposition was obtained. This type of parallel alignment is much better than those obtained by prior methods, because the moving deposition produces surface topographic features that cause the optic axis to lie uniformly in the same direction over the entire surface. These features are inferred to be present from the characteristics of the liquid crystal alignment. They are too small to be observed by most conventional techniques, such as optical microscopy or scanning electron microscopy. Atomic force microscopy reveals what appears to be a surface of sub-micrometer facets, all slightly tilted in one direction. However, this may not be a totally accurate view of the surface. Without subscribing to any particular theory as to what this surface looks like, it is believed that the surface may be covered with very small, randomly spaced bumps during deposition while it is directly beneath the silica beam. As the surface moves on, the sputtered silica beam passes through a slit, diverges, and deposits onto the moving surface beyond the edge of the slit. This diverging beam will deposit material anisotropically onto the trailing side of these bumps, lengthening them and giving them a more gradual slope on that side. When the liquid crystal molecules contact this surface, they will maximize their association with the surface, and to do this, they will lie parallel to the long, trailing edges of the bumps, introducing a tilt. The role of the alcohol treatment is not completely understood, but it appears to allow the liquid crystal molecules to move about to find the minimum energy positions and thereby respond more uniformly to the underlying surface topography. Since there is a strong intermolecular interaction between the liquid crystal molecules that keeps their long axes parallel to each other on a time-averaged basis, their average position will be parallel to the direction of the substrate motion and tilted slightly out of the surface in the direction of the motion.

However, the parallel alignment characteristics of the surface treated by the process of the invention, the ion-beam-etched surface, and the MAD-SAD $SiO_2$ surface used previously in light valve manufacture have been studied. (MAD-SAD represents medium angle deposition followed by shallow angle deposition. It refers to an $SiO_2$ surface deposited by evaporation, first at a medium angle of about 30° from the plane of the surface, and then, after rotating the substrate by 90°, at a shallow angle of 5° from the plane of the surface.) There is a splay in the alignment on the ion-beam-etched surface and the MAD-SAD surface that is consistent with divergence of the beams after they are emitted from the source. This divergence has been measured by studying the liquid crystal alignment with a polarizing microscope. The alignment produced in accordance with the process of the invention is greatly superior.

Clearly, the structure of the alcohol that is used to treat the surface is important, and it is believed that the aromatic ring is also an important feature. However, there are other alcohols that function just as well as 2-phenylethanol for this purpose.

Specifically, one class of alcohols suitably employed in the practice of the invention are those comprising an aromatic ring structure, e.g., phenyl or naphthyl, on one end of an aliphatic chain and a hydroxy group on the other end. The length of the chain varies, and may or may not include at least one ether linkage. Examples of such alcohols include:

2-phenethyl alcohol (2-phenylethanol)

benzyl alcohol 1-phenyl-2-propanol 2-phenyl-1-propanol 3-phenyl-1-propanol 4-phenyl-1-butanol 5-phenyl-1-pentanol 6-phenyl-1-hexanol 1-naphthaleneethanol, also called 2-(1-naphthyl) ethanol 2-naphthaleneethanol, also called 2-(2-naphthyl) ethanol 2-phenoxyethanol.

The preferred alcohols from this group are 2-phenylethanol and 4-phenyl-1-butanol.

A second class of alcohols suitably employed in the practice of the invention include those aliphatic alcohols in which the hydroxy group is on one end and the chain contains at least one ether linkage. Without subscribing to any particular theory, it is believed that the oxygen atom in the ether linkage, which has unshared pairs of electrons, may make the chain lie down parallel to the surface, and this could induce parallel alignment in the liquid crystals. Examples of this group of alcohols include:

2-ethoxyethanol 2-(2-ethoxyethoxy)ethanol.

An objective of the preferred embodiment of the invention is to produce a treated substrate upon which a liquid crystal will self-orient so that the director of the liquid crystal will have a controlled tilt angle with respect to the surface of the substrate, with minimum azimuthal variation. A substrate 20 is illustrated schematically and generally, without showing its detail of construction, in elevation in FIG. 1 and in plan view in FIG. 2. A layer of liquid crystal 22 covers an upper surface 24 of the substrate 20.

As is well-known, a liquid crystal is a state of matter intermediate between that of an isotropic liquid and a solid crystal, and having some properties of each. The liquid crystal is a liquid in the sense that it is a condensed phase that is flowable. It exhibits quasi-crystalline behavior in that its long molecules may exist in an oriented arrangement wherein many molecules are aligned with respect to each other. The direction of alignment is termed the "director" of the liquid crystal.

An important characteristic of a liquid crystal is that its director can be controlled in different ways, two of which are pertinent here. First, the director can be influenced by the physical surroundings of the liquid crystal. That is, the director can be established by the interaction of the molecules of the liquid crystal with a nearby solid surface. Second, the director can be influenced by an applied electric or magnetic field.

In many liquid crystal devices, an initial "field-OFF" director state is determined by the physical surroundings. Electrodes are provided to apply an electric field to the liquid crystal, so that the liquid crystal director is changed to a "field-ON" director state as the electric field overcomes the forces that initially held the director in the field-OFF state and changes it to the field-ON state. Because of the interaction of the liquid crystal with the surfaces, the director is most readily changed to the field-ON director state in the portion of the liquid crystal 22 that is not near a constraining surface. As the field is increased, the volume of liquid crystal having the field-ON director state is enlarged, until, at a sufficiently high field, virtually all of the liquid crystal, except possibly a thin film of one or slightly more than one monomolecular layer near the constraining surfaces, may be rotated to the field-ON director state.

The significance of changing the orientation of the director of the liquid crystal is that the liquid crystal interacts with light beams that pass through it in a manner that depends upon the angle of the director relative to the transmitted light beam and its plane of polarization. The balance of forces within liquid crystals is such that the electric field required to accomplish the control of the transmitted beam is very small, so that the liquid crystal provides a projection beam control device that requires very little power.

Figure 2:
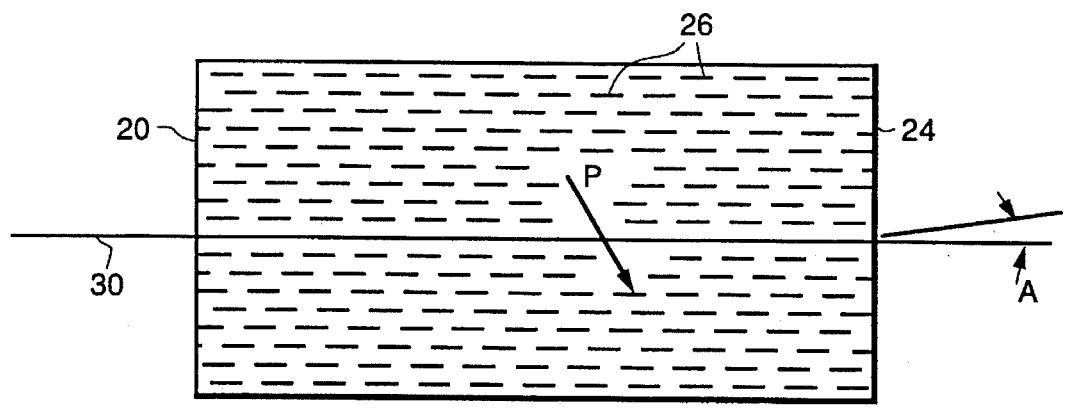
FIG. 2 is a schematic plan view of the substrate of FIG. 1, with the electric field in the field-OFF state.

Returning to FIG. 1, the director 26 of the liquid crystal 22 is oriented at a small tilt angle T from a line 28 that is parallel to the upper surface 24 of the substrate 20. If this were the only limitation, the director at different locations on the substrate could be anywhere within a conical surface defined by the tilt angle T. However, as shown in FIG. 2, when viewed in plan view, the projection of the director onto the surface of the substrate 20 is nearly parallel to an azimuthal line 30. The variation from the ideal azimuthal alignment is defined by an angle A, which is as small as possible.

Figure 3:
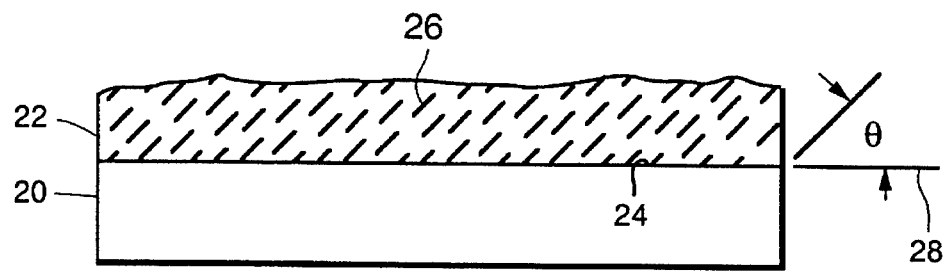
FIG. 3 is a schematic side elevational view of the substrate of FIG. 1, with the electric field in the field-ON state.

When no electric field is applied to the liquid crystal 22, the director 26 is everywhere aligned at a small tilt angle T, preferably from about 0.5° to 4° and, more preferably, from about 15° to 3°, from the parallel line 28. When a sufficiently large electric field is applied in the direction perpendicular to the parallel line 28 (that is, perpendicular to the surface 24) and the liquid crystal has a positive dielectric anisotropy, the directors 26 reorient everywhere (except possibly immediately adjacent the constraining surfaces) to lie at an angle θ to the surface 24, as shown schematically in FIG. 3. The angle of the tilt in an applied field is continuously variable from the initial angle up to or approaching the angle of 90°. The angle depends on the field, once the field exceeds a threshold, and at high field strengths, will approach 90°.

The director at different locations across the surface of the liquid crystal points in substantially the same azimuthal direction 30, as shown in FIG. 2. The alignment in the azimuthal direction 30 is significant, because all of the directors across the surface have the same angle with respect to a polarization vector P of the beam, as shown in FIG. 2. As the electric field is further increased, the director everywhere rotates to lie nearly perpendicular to the plane of the surface 24.

The tilt direction is parallel to the direction of motion during silica deposition. More specifically, the distal end of the liquid crystal molecules point in the direction of the motion on the last pass under the target. It will be noted that this is the opposite of the tilted perpendicular alignment of the prior art.

In accordance with the invention, a method for preparing a liquid crystal device comprises the steps of furnishing a substrate and depositing a layer of silica on the substrate by magnetron in-line sputtering, with the substrate moving past a silica sputtering target of the sputtering apparatus during the step of depositing, such as described in the above-referenced application Ser. No. 07/715,537. The substrate with the deposited layer of silica is then preferably treated with one or more of the alcohols described above, and covered with a layer of liquid crystal.

Figure 4:
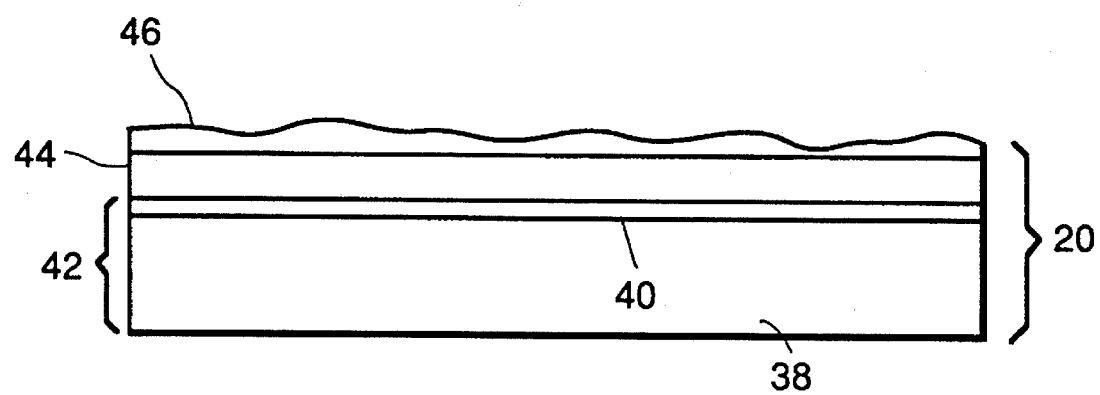
FIG. 4 is a side elevational view of a treated substrate in accordance with the invention.

The detailed structure of the substrate 20 in accordance with the present invention is illustrated in FIG. 4. The substrate 20 includes a transparent support 38, which is typically glass, such as Type BK7A glass, or quartz. Overlying the support 38 is a thin electrically conductive layer 40, which is typically indium-tin-oxide in a thickness of about 400 Å. The layer 40 can support and carry a charge that creates an electric field, but is still transparent to light. The support 38 and conductive layer 40 are sometimes collectively termed the untreated substrate 42.

Overlying the untreated substrate 42 is a layer of silica 44 that is from 12 to 3,000 Å thick, and most preferably is from about 250 to about 1,500 Å thick. The silica layer 44 may be greater than 3,000 Å thick and achieve proper liquid crystal orientations, but thicker layers are less desirable in operating devices because they act to insulate the underlying electrodes. The silica is oxidized silicon of the form $SiO_x$, where x generally is close to 2. The silica layer 44 is applied in a particular manner by magnetron in-line sputtering, as will be described subsequently. After the silica layer 44 is applied, it is treated with the alcohol.

The alcohol treatment is either with liquid alcohol or alcohol vapor, preferably with the substrate and the alcohol at a temperature of about 100° C. or above, and most preferably from about 120° to 160° C. The treatment is readily accomplished by exposing the substrate to the alcohol at this temperature for a sufficient period of time such as about two hours, as described in U.S. Pat. No. 4,464,134.

The alcohol reacts with the hydroxyl groups on the silica surface, leaving a residue that is here indicated as a layer 46. However, it should be understood that the "layer" 46 is extremely thin, and probably monomolecular in thickness.

The silica layer 44 is deposited by magnetron in-line sputtering, with the substrate 4 2 moving past the sputtering target. Such sputtering devices are available commercially, and a satisfactory device is the model MRC 943 available from Materials Research Corporation, Orangeburg, N.Y. 10962.

To deposit silica from the silica sputtering target, sputtering is accomplished by conventional rf magnetron sputtering. Any silica thickness from about 12 to 3,000 Å is acceptable, with a thickness of about 250 to 1,500 Å preferred. Radio frequency power levels of from about 0.2 to about 1.5 kilowatts are available in the MRC 943 unit, and a power level of about 1 kilowatt is preferred.

The substrate 42 is continuously moved back-and-forth past the silica sputtering target during deposition. The extent of travel is sufficient so that the substrate clears the silica target at the end of each traverse past the target. The traversing rate can be from about 2 to 400 centimeters per minute. With preferred conditions of a minimum distance from the silica source to the substrate of about 5 centimeters, a power level of 1 kilowatt, and a total 1,500 Å thickness of silica, one preferred traversing rate is about 19 centimeters per minute. The substrate is uniformly moved at this rate between the limits of travel, at which limits it reverses. In another preferred approach, deposition has been successfully accomplished with a very low rate of movement of about 3.2 centimeters per minute, so that only one pass in one direction was required to produce a silica layer. In yet another preferred embodiment, 250 Å of silica is deposited by a single pass at a rate of 19 centimeters per minute. During deposition of silica the deposition chamber is preferably back filled with a pressure of from about 3 to 25 millitorr, preferably about 10 millitorr, of argon gas. These pressures produce an acceptable quality of the deposited silica, and also permit stable plasma discharge operation of the rf magnetron sputtering apparatus.

After the desired thickness of silica is deposited, the silica-coated substrates are removed from the deposition chamber. The substrates are thereafter treated with alcohol in the manner previously discussed.

Treated substrates are used to construct liquid crystal devices. The layer of liquid crystal 22 is placed upon the treated substrate 20. In one particular device, the liquid crystal material has a positive dielectric anisotropy, so that application of an electric field causes the director to orient parallel to the electric field and perpendicular to the substrate. A spacer (not shown) is placed onto the substrate 20. The spacer may be, for example, a Mylar plastic piece about 0.00025 to about 0.001 inch thick. A second treated substrate is placed over the top of the first treated substrate in an inverted orientation, resting on the spacers. Care is taken to orient the second substrate so that the direction of tilt at this substrate relative to that at the first substrate conforms to whatever type of alignment is desired. Thus, the substrate can be oriented so that there can be a twist in the liquid crystal director in the electric field-OFF state, proceeding from the surface of one substrate to the surface of the other substrate. In the usual case, however, no twist is desired, and the substrates are placed so that the director is oriented everywhere the same throughout the liquid crystal layer and throughout the cell. This operation is not complex, and requires only keeping track of the orientation of the substrate in the sputtering device. Electrical connection from an external voltage source (not shown) to the electrically conductive layers through terminals is made either before or after the device is assembled.

EXAMPLES

Example 1

A uniform parallel alignment was induced in a two-step process utilizing ion beam sputtering. A 1,500 $SiO_2$ layer was deposited by conventional sputtering. The substrate moved past the sputtering source at 3.2 mm/min; travel was one cycle right to left on a ⅛ inch thick stainless steel pallet. Source power was 1.02 KW. Argon gas was introduced at 10 μm/min.

For treatment of the $SiO_2$ surface with phenethyl alcohol ($C_6H_5CH_2CH_2OH$), the substrates were placed in a basket and submerged in the alcohol. Refluxing the vapors allowed the reaction to proceed for an extended period of time (three hours at 140° C.) without loss of alcohol.

After treatment, the substrate was washed thoroughly with chloroform and hexane to remove unreacted material. A test cell was constructed with a 1 mil Mylar spacer and a proprietary liquid crystal mixture, HRL-SP67, with a negative dielectric anisotropy of $-1.1$. This liquid crystal mixture spontaneously oriented its molecular axis parallel to the high energy surface treated with phenethyl alcohol and showed evidence of a strong anchoring force. The initial evaluation of alignment in the OFF state showed very good quality by observation between crossed polarizers. The orientation was parallel but it could not be changed significantly by applying an electric field, since the liquid crystal had a negative dielectric anisotropy.

This cell was then disassembled and the substrate was washed with chloroform and hexane to remove the HRL-SP67 liquid crystal, and reconstructed with a 1 mil Mylar spacer and a proprietary liquid crystal, HRL-SP36, with a negative dielectric anisotropy of $-0.9$. This second liquid crystal mixture spontaneously oriented its molecular axis parallel to the high energy surface treated with phenethyl alcohol and could not be activated, as would be expected for a liquid crystal with a negative dielectric anisotropy.

This cell was next disassembled and the substrate was washed with chloroform and hexane to remove the liquid crystal. The cell was then reconstructed with a commercial liquid crystal, E-7, which contains about 51% 4-cyano-4'-n-pentylbiphenyl, about 25% 4-cyano-4'-n-heptylbiphenyl, about 16% 4-cyano-4'-n-octyloxybiphenyl, and about 8% 4-cyano-4"-n-pentyl-p-terphenyl, and which has a positive dielectric anisotropy of $+11$.

The quality of the alignment was determined by examining the liquid crystal cell with a polarizing microscope, where the cell was attached to a rotatable stage and observed between two light polarizing filters, identified as the polarizer and the analyzer. By keeping the polarizer fixed and then rotating both the stage and the analyzer until the minimum light transmission positions were located, it was possible to determine the azimuthal angle of the liquid crystal director at both the bottom and the top surfaces of the cell.

The foregoing measurements were made for nine spots in the cell, with spots located at points on a grid 1.0 cm apart. These spots can be taken as a measure of the uniformity of azimuthal alignment in the cell. All of the measurements were taken as angles between the liquid crystal director and one edge of the cell. For one substrate, this angle was $-2.45\pm0.65°$ for the nine spots, and for the opposing electrode, it was $-2.8\pm1.0°$ for the same nine locations. (The measured angles themselves are not particularly significant for the purposes of this discussion, since the angle is a function of the angle between the direction of travel when the $SiO_2$ was deposited and the edges of the substrates. The variation in these measured angles is very important, however, since this provides a measure of the uniformity of the azimuthal angle throughout the cell.) This represents excellent uniformity of alignment, significantly better than any previously seen by the inventors in any other homogeneously aligned cell. Although the absolute accuracy of the measurements has not been determined, it is estimated that the error is about $\pm1.0°$. The twist angle in the liquid crystal between the two substrates at these nine spots ranged from $+0.9$ to $-1.5°$. This is a very small amount of twist, also indicating the uniformity of alignment.

The average tilt angle was obtained by a method in which the capacitance of the cell was measured with the cell between the poles of a 10 kGauss electromagnet. With the magnetic field on, the liquid crystal director was rotated by the field, and this caused a change in the capacitance of the cell. The cell was then rotated until the capacitance was the same with the magnetic field on or off. At this position, the director was unchanged by the field, and the director in the field-OFF state was parallel to the direction of the field in the field-ON state. In this way, the tilt angle was determined to be 1.6° relative to the surface-parallel position.

Example 2

Two glass substrates with conductive coatings of indium-tin oxide (ITO) were overcoated with silica by magnetron sputtering in the MRC 943 described in Example 1, except that the source power was 1.2 kW. The coated substrates were then treated with a commercially available sample of 4-phenyl-1-butanol by placing them in the melted alcohol at 140° C. for 2 hours. The substrates were removed from the alcohol, cooled, and washed thoroughly with chloroform and with hexane to remove all of the unreacted alcohol. A test cell was constructed with a 1-mil Mylar spacer and the commercial liquid crystal, E-7. The alignment was examined between crossed polarizers both in the OFF state and as an electrical field was applied across the liquid crystal. The alignment was uniform and free of domains, and all of the liquid crystal material was reoriented in one direction by the applied field.

The present invention is expected to find use in avionic displays, automotive displays, projection displays, optical computing, optical shutters, and the like which employ liquid crystal displays.

Thus, there has been disclosed a method for preparing a treated substrate to produce tilted parallel alignment of a liquid crystal on a substrate surface. It will be readily apparent to those skilled in this art that various changes and modifications of an obvious nature may be made, and all such changes and modifications are considered to fall within the scope of the present invention, as defined by the appended claims.

What is claimed is:

1. A method for preparing a treated substrate to produce tilted parallel alignment of a liquid crystal on a surface of said substrate, comprising the steps of:

(a) moving said substrate past a source of silica;

(b) depositing a layer of silica on said substrate from said source of silica as said substrate is moved past said source during the deposition;

(c) treating the silica-coated substrate with an alcohol selected from the group consisting of (i) aliphatic alcohols having an aromatic ring structure on one end of an aliphatic chain and a hydroxy group on the other end, (ii) aliphatic alcohols having an aromatic ring structure on one end of an aliphatic chain and a hydroxy group on the other end, with at least one ether group in the chain, and (iii) an aliphatic chain having a hydroxy group at one end and at least one ether linkage in the chain; and (d) covering said treated substrate with a layer of said liquid crystal.

2. The method of claim 1 wherein said substrate comprises glass or quartz.

3. The method of claim 1 wherein said substrate comprises a liquid crystal light valve substrate.

4. The method of claim 1 wherein said substrate is provided with an electrically conductive coating prior to the step of moving.

5. The method of claim 1 wherein the step of depositing is accomplished in at least one pass of said substrate past said source.

6. The method of claim 1 wherein the step of treating is accomplished with said substrate at a temperature of about 120° to 160° C.

7. The method of claim 1 wherein said alcohol is selected from the group consisting of 2-phenylethanol, benzyl alcohol, 1-phenyl-2-propanol, 2-phenyl-1-propanol, 3-phenyl-1-propanol, 4-phenyl-1-butanol, 5-phenyl-1-pentanol, 6-phenyl-1-hexanol, 1-naphthaleneethanol, 2-naphthaleneethanol, 2-phenoxyethanol, 2-ethoxyethanol, and 2-(2-ethoxyethoxy)ethanol.

8. The method of claim 7 wherein said alcohol is selected from the group consisting of 2-phenylethanol and 4-phenyl-1-butanol.

9. The method of claim 1 wherein said source of silica includes a sputtering target and said silica is deposited by sputtering.

10. The method of claim 9 wherein said sputtering target comprises a magnetron sputtering target and said silica is deposited by in-line magnetron sputtering.

11. The method of claim 1 wherein said liquid crystal comprises elongated molecules whose combined long molecular axes define a macroscopic director, with both tilt angle and tilt direction of said director being substantially uniform, predictable, and controllable, said director at all points across the surface of said substrate having an azimuthal direction that is substantially uniform, such that the projection of said director onto said substrate surface is everywhere approximately parallel.

12. A method for preparing a treated substrate to produce tilted parallel alignment of a liquid crystal on said substrate, comprising the steps of:

(a) moving said substrate past a sputtering target comprising silica;

(b) depositing by in-line magnetron sputtering a layer of silica on said substrate from said source of silica as said substrate is moved past said source during the deposition;

(c) treating said substrate coated with silica with either 2-phenylethanol or 4-phenyl-1-butanol; and (d) covering said treated substrate with a layer of liquid crystal.

13. The method of claim 12 wherein said substrate comprises glass or quartz.

14. The method of claim 12 wherein said substrate comprises a liquid crystal light valve substrate.

15. The method of claim 12 wherein said substrate is provided with an electrically conductive coating prior to the step of moving.

16. The method of claim 12 wherein the step of depositing is accomplished in at least one pass of said substrate past said source.

17. The method of claim 12 wherein the step of treating is accomplished with said substrate at a temperature of about 120° to 160° C.

18. The method of claim 12 wherein the thickness of said layer of silica ranges from about 12 to 3,000 Å.

19. The method of claim 12 wherein said liquid crystal comprises elongated molecules whose combined long molecular axes define a macroscopic director, with both tilt angle and tilt direction of said director being substantially uniform, predictable, and controllable, said director at all points across the surface of said substrate having an azimuthal direction that is substantially uniform, such that the projection of said director onto said substrate surface is everywhere approximately parallel.

* * * * *